(12) United States Patent
Hubbard

(10) Patent No.: US 9,746,697 B1
(45) Date of Patent: Aug. 29, 2017

(54) EYEGLASS REAR MIRROR SYSTEM AND METHOD OF USE

(71) Applicant: Jerry Van Hubbard, Mansfield, TX (US)

(72) Inventor: Jerry Van Hubbard, Mansfield, TX (US)

(*) Notice: Subject to any disclaimer, the term of this patent is extended or adjusted under 35 U.S.C. 154(b) by 0 days.

(21) Appl. No.: 14/790,234

(22) Filed: Jul. 2, 2015

Related U.S. Application Data

(60) Provisional application No. 62/130,507, filed on Mar. 9, 2015.

(51) Int. Cl.
*G02C 5/14* (2006.01)
*G02C 7/14* (2006.01)

(52) U.S. Cl.
CPC ............ *G02C 7/14* (2013.01); *G02C 5/14* (2013.01); *G02C 2200/06* (2013.01)

(58) Field of Classification Search
CPC ........ G02C 7/14; G02C 5/14; G02C 2200/06; G02C 9/04; G02C 5/143; G02C 5/22; G02C 11/00; A42B 3/0426; G02B 7/1824; Y10T 24/1371

USPC .......... 351/50, 41, 111, 113, 121, 155, 158; 359/880; 2/13, 448–450; 24/3.3
See application file for complete search history.

(56) References Cited

U.S. PATENT DOCUMENTS

| | | | | |
|---|---|---|---|---|
| 4,798,454 A | * | 1/1989 | Hyun | G02C 9/02 351/158 |
| 6,007,198 A | * | 12/1999 | Burton | G02C 9/02 351/41 |

FOREIGN PATENT DOCUMENTS

| | | | | |
|---|---|---|---|---|
| FR | 1021962 A | * | 2/1953 | G02C 7/14 |

* cited by examiner

*Primary Examiner* — Thomas K Pham
*Assistant Examiner* — Ibrahima Diedhiou
(74) *Attorney, Agent, or Firm* — Eldredge Law Firm; Richard G. Eldredge

(57) ABSTRACT

A rear-viewing mirror assembly for a pair of glasses having an arm, the mirror assembly includes a housing forming an inner area and configured to secure to the arm; a locking mechanism disposed within the inner area of the housing; an elongated rod extending partially outside the housing and engaged with the locking mechanism; and a mirror rigidly attached to the elongated rod.

1 Claim, 8 Drawing Sheets

EYEGLASS REAR MIRROR SYSTEM AND METHOD OF USE

BACKGROUND

1. Field of the Invention

The present invention relates generally to glasses and goggles.

2. Description of Related Art

Glasses and goggles are well known in the art and are effective means to allow a person to view in a forward fashion. FIG. 1 depicts an oblique view of a conventional pair of glasses 101 having a frame 107 integrally joined between two arms 103, 105. As commonly known, the lenses of the glasses allow the user to see in a frontward fashion, but not in a rearward fashion.

Although great strides have been made in the area of glasses and goggles, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
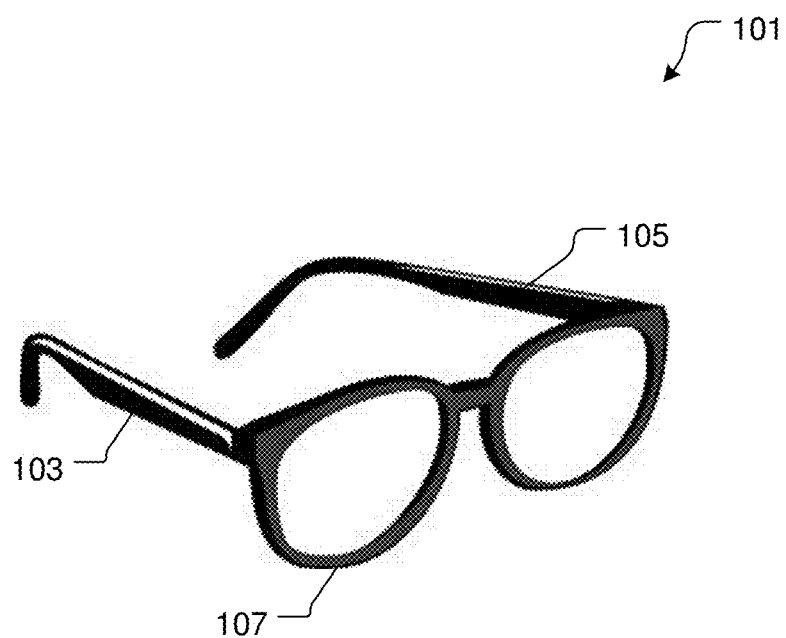
FIG. 1 is an oblique view of a conventional pair of glasses.

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional eyewear. Specifically, the system and method of the present application provides rapid and effective means to see in both the front and rear views, thus providing visual notice to the user of a person or object approaching in the rear. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
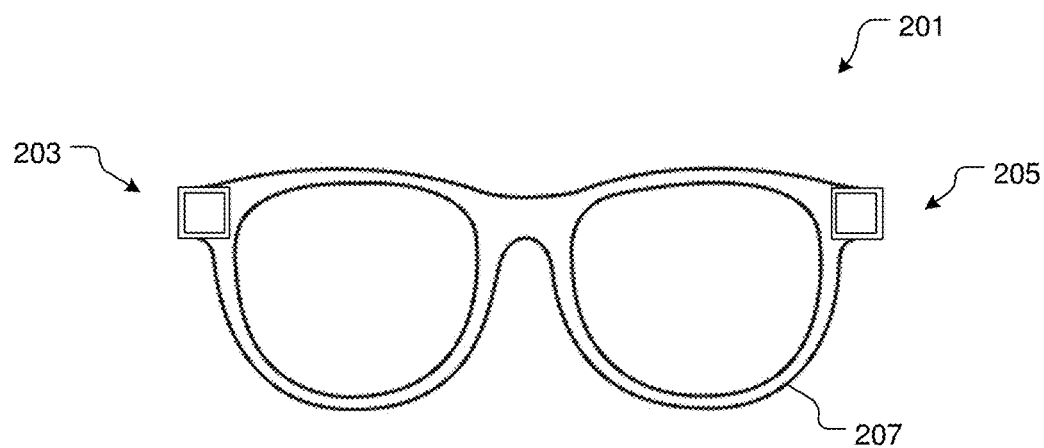
FIG. 2 is a front view of a pair of glasses in accordance with a preferred embodiment of the present application.
Figure 3:
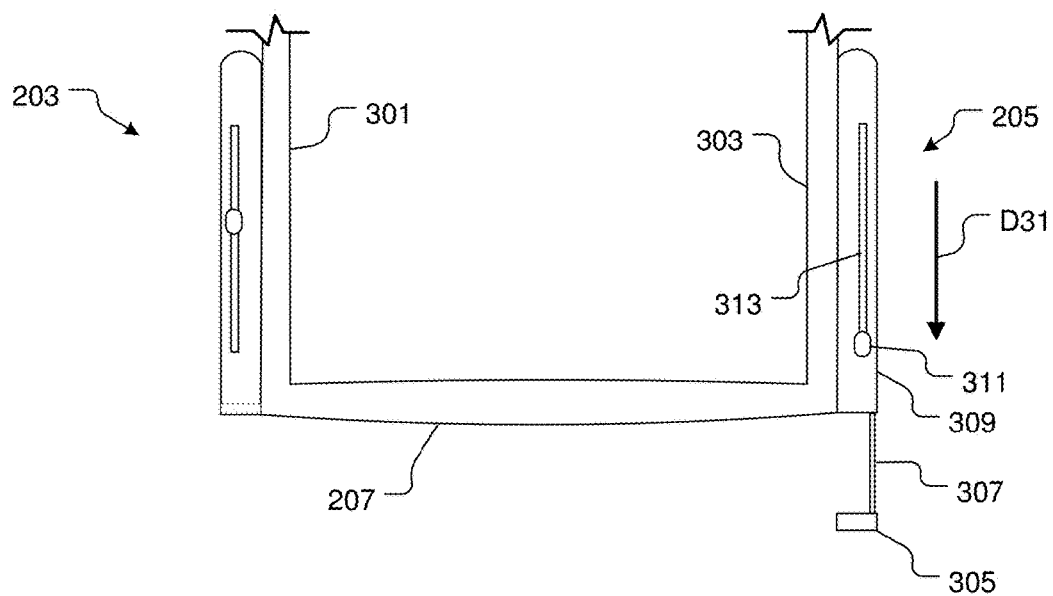
FIG. 3 is a top view of the glasses of FIG. 2.

Referring now to the drawings wherein like reference characters identify corresponding or similar elements throughout the several views, FIGS. 2 and 3 depict respective front and top views of a pair of glasses/goggles 201 in accordance with a preferred embodiment of the present application. It will be appreciated that the pair of glasses/goggles 201 overcomes one of more of the above-listed problems commonly associated with the conventional eyewear.

In the contemplated embodiment, glasses/goggles 201 includes a lens frame 207 integrally attached to two arms 301, 303. A first mirror assembly 203 is integrally secured to arm 301, and likewise a second mirror assembly 205 is integrally secured to arm 303. It will be appreciated that the features of mirror assemblies 203, 205 provide means for the user to view in a rearward fashion.

For the sake of simplicity, only mirror assembly 205 is discussed in detail. However, it should be understood that assembly 203 is substantially identical in form and function.

Figure 4A:
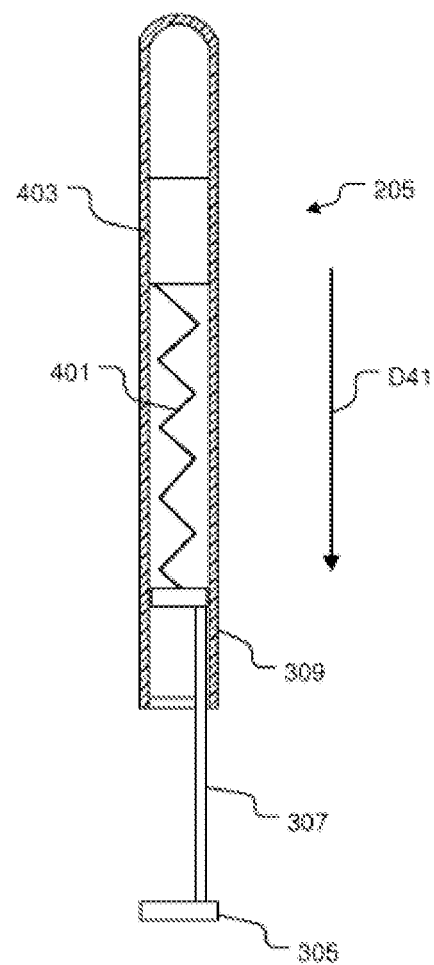
FIGS. 4A and 4B are top cross-sectional views of the mirror assembly in the extended and retracted positions.
Figure 4B:
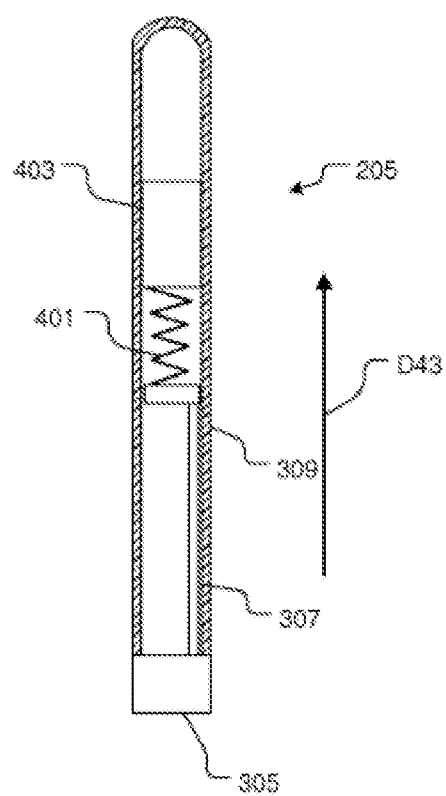

Assembly 205 includes a housing 309 forming an interior cavity and configured to carry a spring 401 and stop 403 therein (see, e.g., FIG. 4). The spring in turn is secured to an elongated rod 307 that secures to a mirror 305. During use, the mirror is moved in direction D31 in-and-out of the house via a locking device 311 that slidingly engages with a track 313 extending through the thickness of the housing. Such features are better shown in FIGS. 4A and 4B, in directions D41, D43.

Figure 5A:
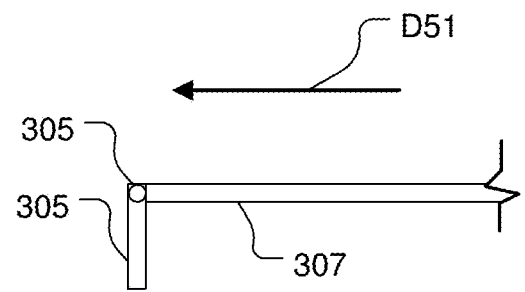
FIGS. 5A and 5B are side views of an extended and retracted position of the mirrors of the mirror assembly of FIGS. 4A and 4B.
Figure 5B:
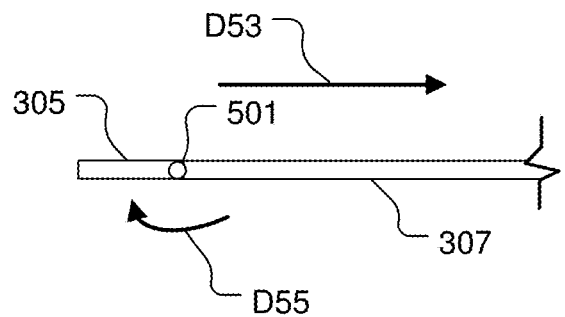

One of the unique features believed characteristic of the present invention is the ability to hide the mirror 307 within the cavity formed by the housing. In FIGS. 5A and 5B, one method to achieve this feature is to use a spring loaded pivot joint 501 that allows the mirror body to extend when being pushed into the cavity, as depicted with arrow D53 and pivot while being pushed out, as shown with arrow D51.

Figures 6A, 6B:
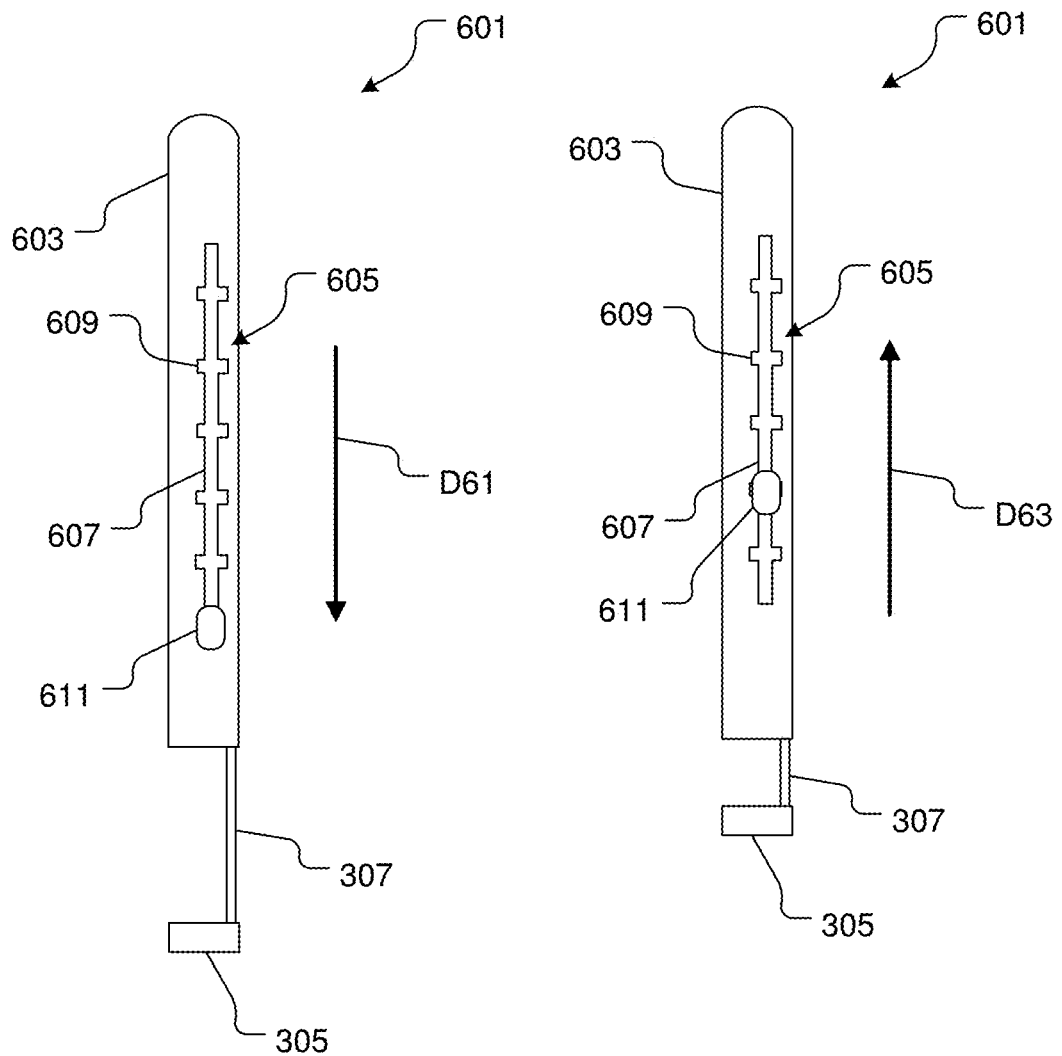
FIGS. 6A and 6B are top views of a mirror assembly in the extended and retracted positions in accordance with an alternative embodiment of the present application.

Referring now to FIGS. 6A and 6B in the drawings, an alternative embodiment is shown. As depicted, assembly 601 includes a body 603 that utilizes a locking system 605 with an elongated track 607 that extends through the thickness of body 603 and engages with a locking 611, which in turn is attached to member 307 and mirror 305. A plurality of stops 607 are positioned along track 607 and are configured to allow selective adjustment of the locking device 611 along the track 607. This feature allows adjustment of the mirror 305, as shown with arrows D61, D63 relative to the glasses/goggles for selective viewing access.

Figure 7:
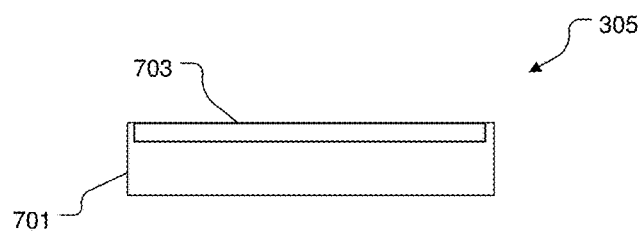
FIGS. 7, 8, and 9 are top views of mirrors in accordance with an alternative embodiments of the present application.
Figure 8:
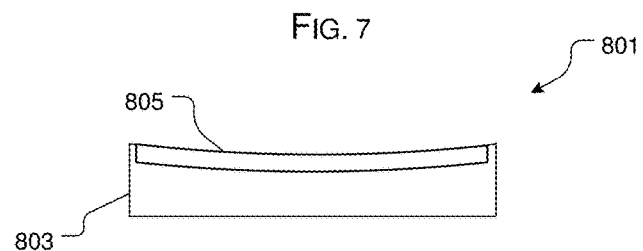
Figure 9:
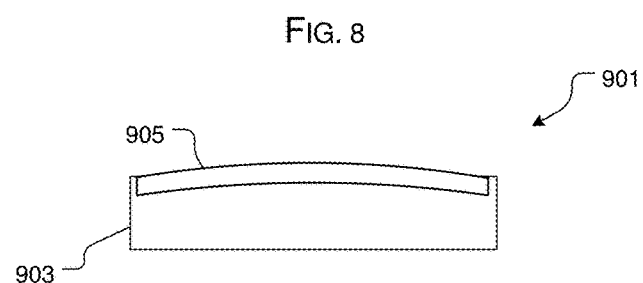

In FIGS. 7-9, it is also contemplated having different types of mirrored surfaces. For example, FIG. 7 illustrates mirror 305 having a relatively flat reflective surface 703 secured to body 701, while FIG. 8 illustrates a mirror 801 with an inwardly facing reflective surface 805 secured to body 803, and FIG. 9 illustrates a mirror 901 with an outwardly facing reflective surface 905 secured to a body 903.

Figure 10:
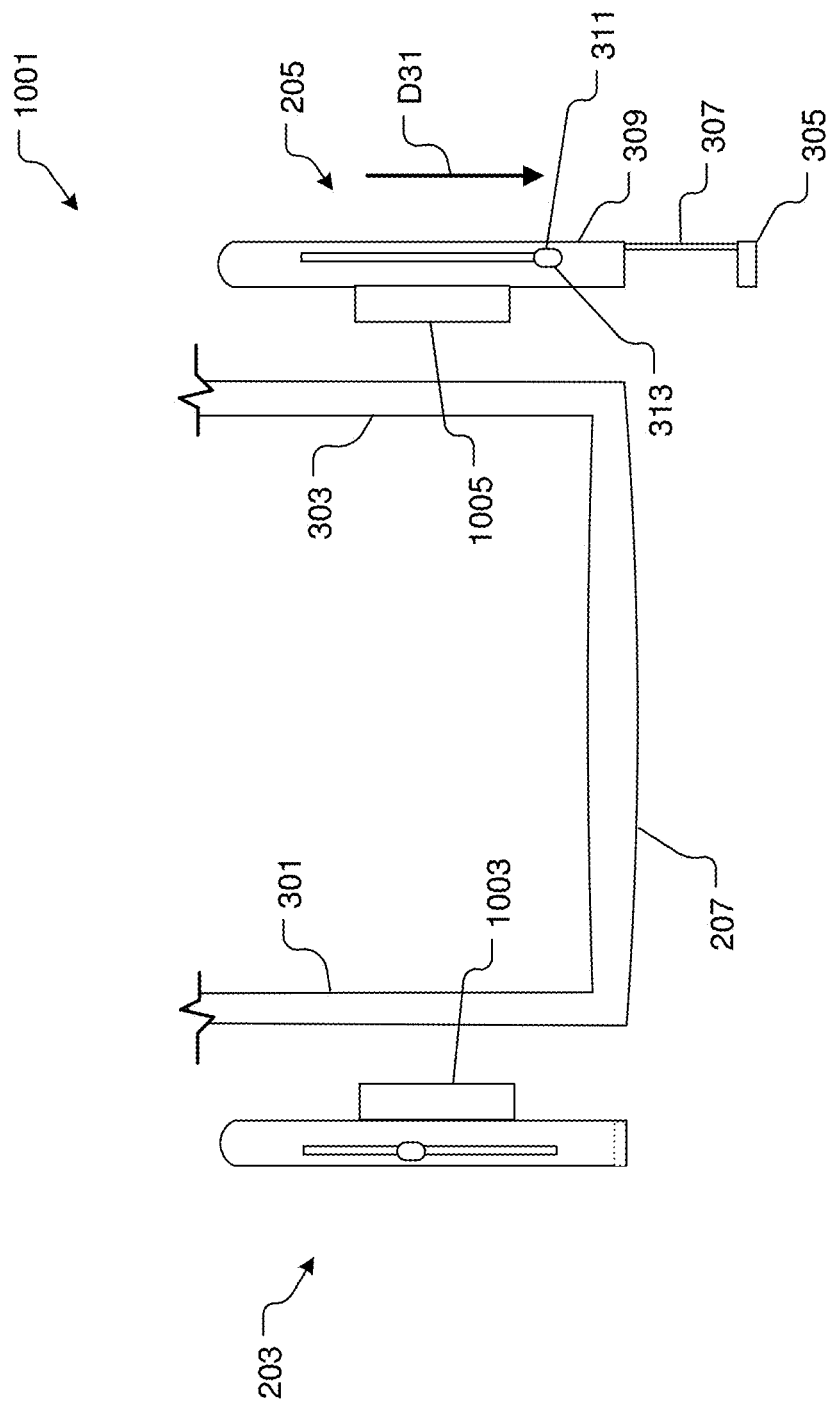
FIG. 10 is a top view of a pair of glasses in accordance with an alternative embodiment of the present application.

In FIG. 10, it is also contemplated having a plurality of attachment devices utilized to detachably secure the mirror assemblies to the arms. For example, glasses/goggles 1001 include a first clip 1003 and a second clip 1005 configured to engage with the mirror assemblies and the arms. This feature allows the features discussed herein to be used on existing types of glasses/goggles, thus allowing a retrofit feature.

Figure 11:
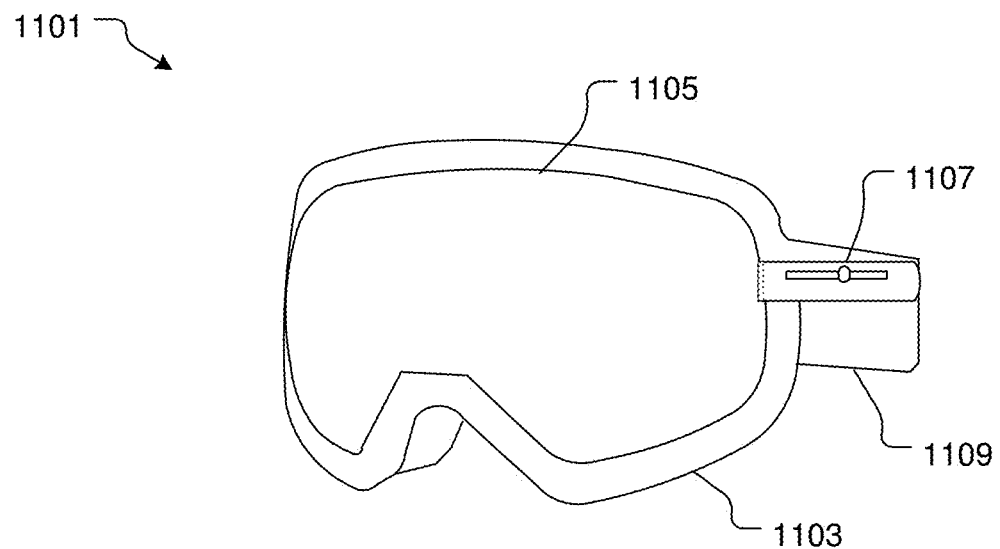
FIGS. 11 and 12 are respective oblique and front views of snow googles in accordance with an alternative embodiment of the present application While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.
Figure 12:
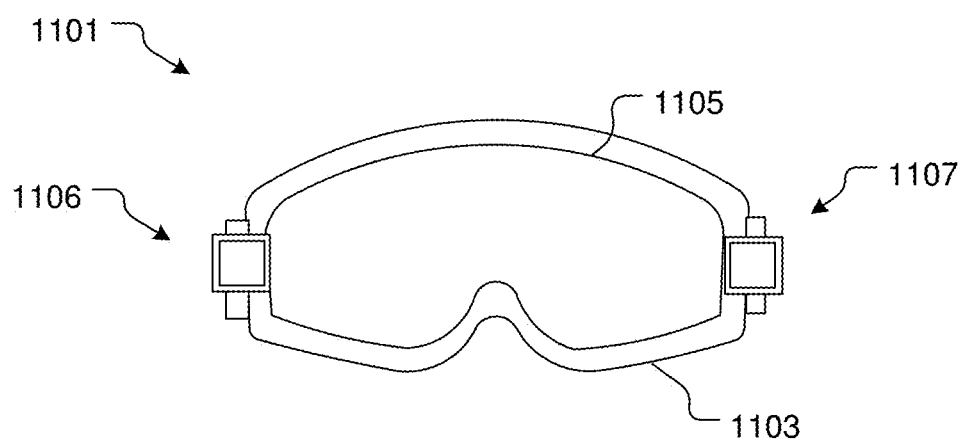

Referring now to FIGS. 11 and 12 in the drawings, respective oblique and front views of a pair of googles 1101 are shown in accordance with an alternative embodiment of the present application. It should be appreciated that goggles 1101 are substantially similar in form and function to one or more of the embodiments discussed above. Specifically, googles 1101 includes a frame 1103 with lens 1105 carried therein. Like the embodiments discussed above, googles 1101 is configured to include an assemblies 1106 and 1107 configured to allow the user to view in the rear, similar to assemblies 203 and 205.

In one contemplated embodiment, the assembly could be placed on the frame 1103 and/or strap 1109 secured to the frame.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rear-viewing mirror assembly for a pair of glasses having an arm, the mirror assembly, comprising:
   a housing removably secured to the arm, the housing having:
      an inner area; and
      a track with a first adjustment notch, a second adjustment notch, and a third adjustment notch;
   an elongated rod extending partially outside the inner area of the housing;
   a locking mechanism attached to the elongated rod and extending through the track from the inner area of the housing, the locking mechanism having:
      a knob extended through the track and configured to engage with the first, second, and third adjustment notches to alter a distance the elongated rod is extended from the inner area of the housing;
   a mirror pivotally attached to the elongated rod about a pivot joint, the mirror having a size and shape appropriate to slide within the inner area of the housing; and
   a clip rigidly attached to and extending from the housing, the clip structured to removably engage with the arm of the pair of glasses;
   wherein the mirror is adjusted relative to the housing via sliding the locking mechanism within the track and securing the knob with the first adjustment notch or the second adjustment notch; and
   wherein the mirror provides rear-viewing access.

* * * * *